Figure 1:
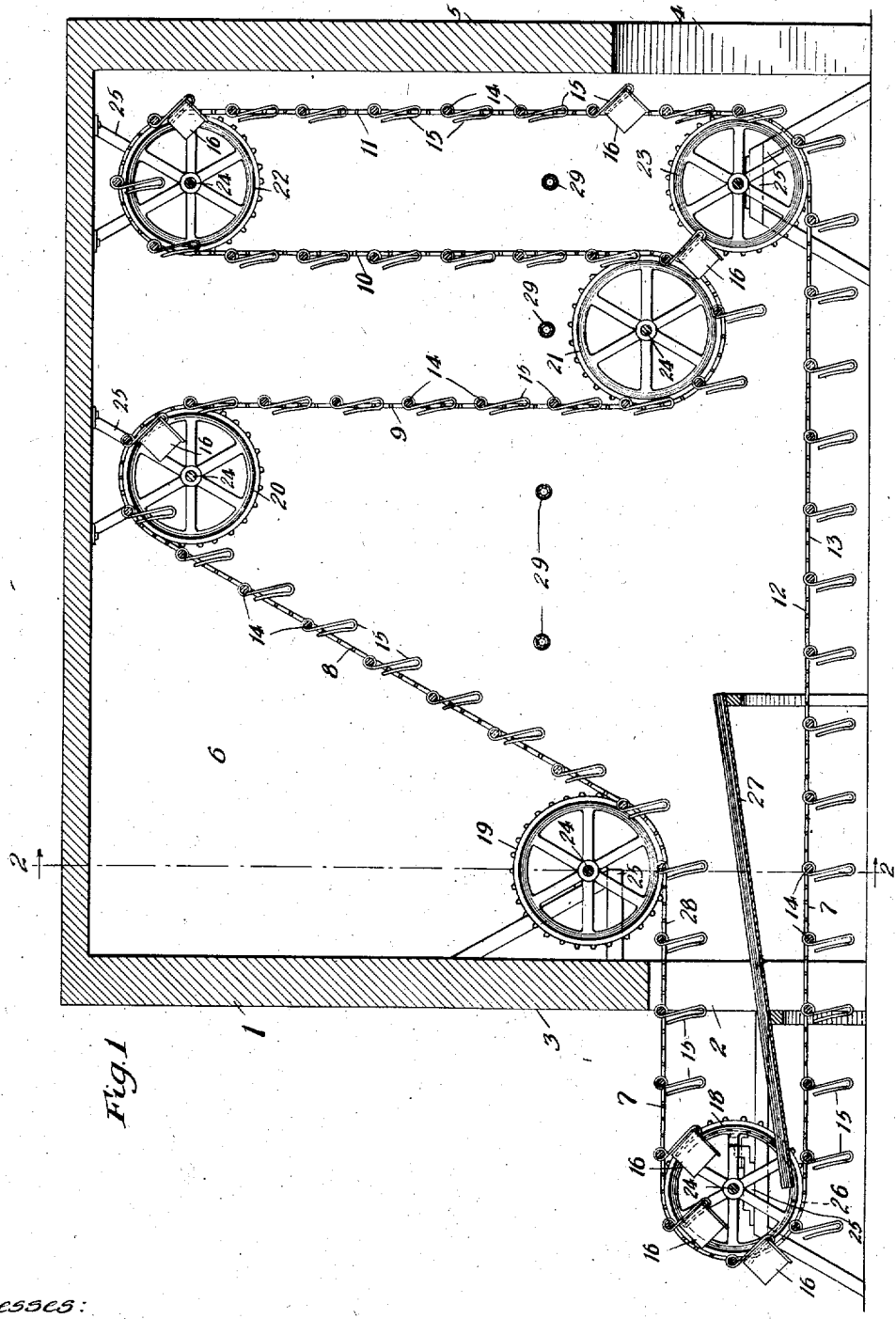

F. RUDOLPH.
OVEN FOR DRYING OR BAKING COATED METAL VESSELS OR OTHER ARTICLES.
APPLICATION FILED MAY 28, 1910.

1,086,731.

Patented Feb. 10, 1914.

4 SHEETS—SHEET 1.

Witnesses:
Wm. Geiger
H. W. Munday

Inventor
Franklin Rudolph
BY Munday, Evarts, Adcock & Clarke.
Attorneys

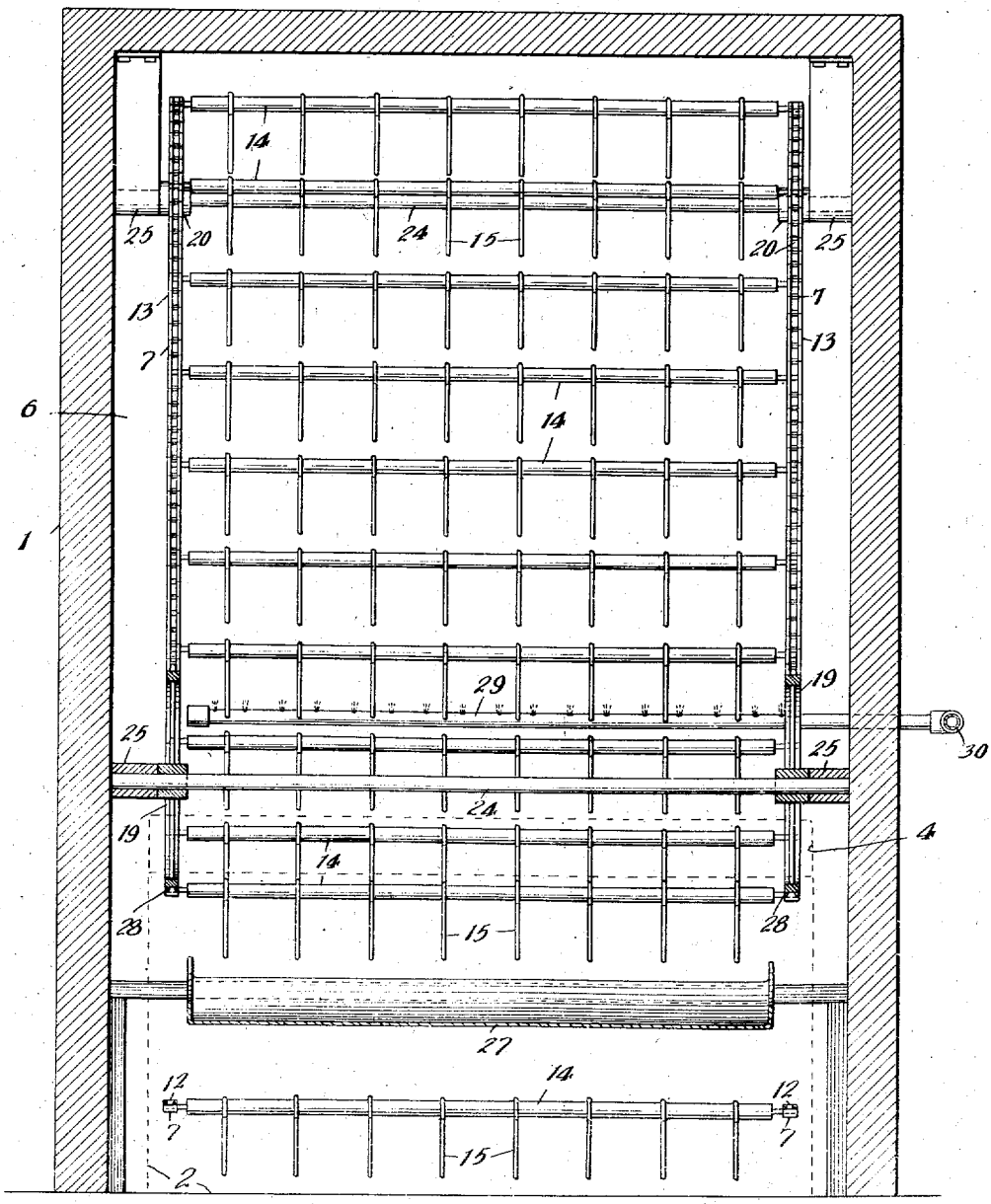

F. RUDOLPH.
OVEN FOR DRYING OR BAKING COATED METAL VESSELS OR OTHER ARTICLES.
APPLICATION FILED MAY 28, 1910.
1,086,731.
Patented Feb. 10, 1914.
4 SHEETS—SHEET 3.
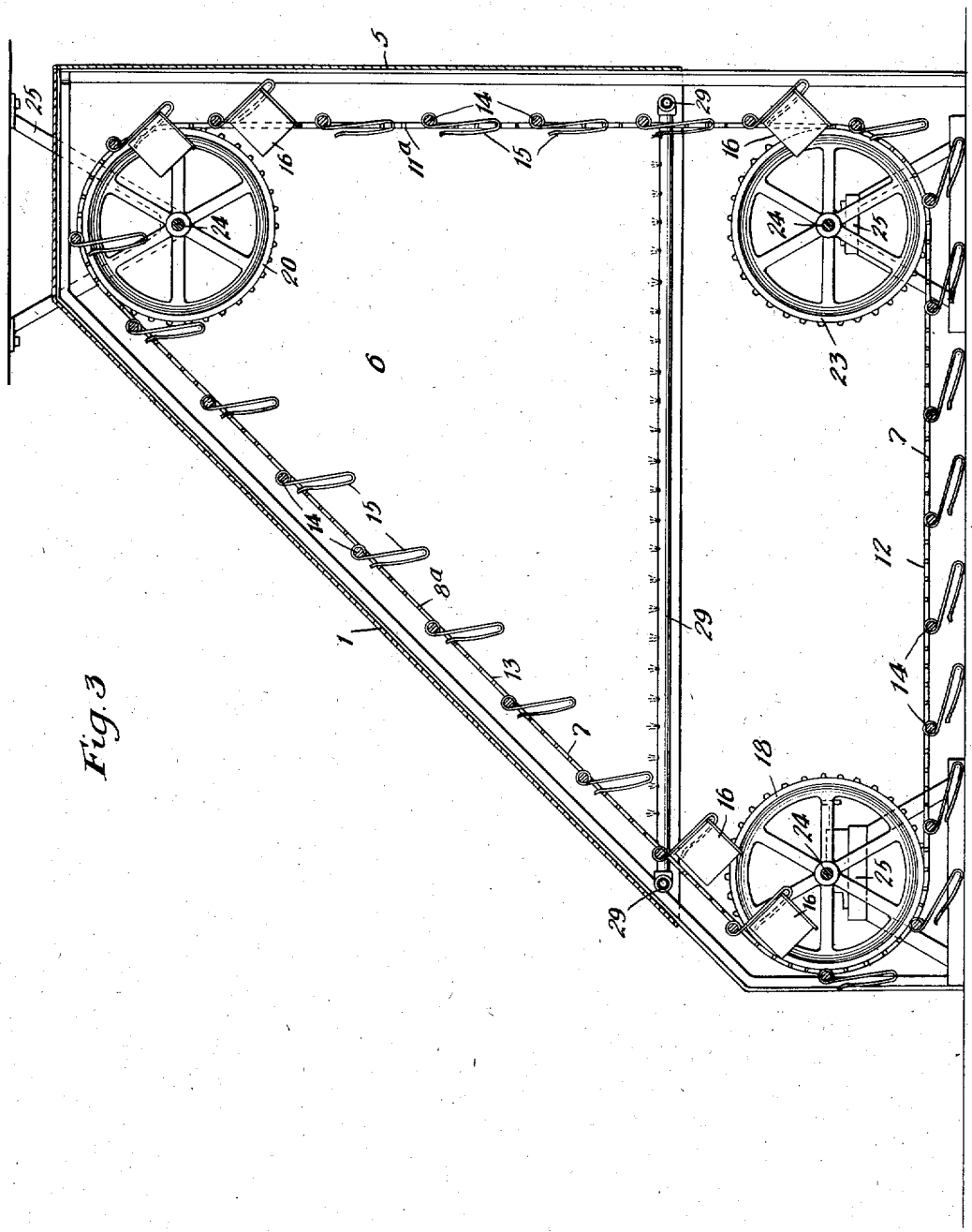
Witnesses:
Wm. Geiger
H. W. Munday
Inventor
Franklin Rudolph
By Munday, Evarts, Adcock & Clarke,
Attorneys

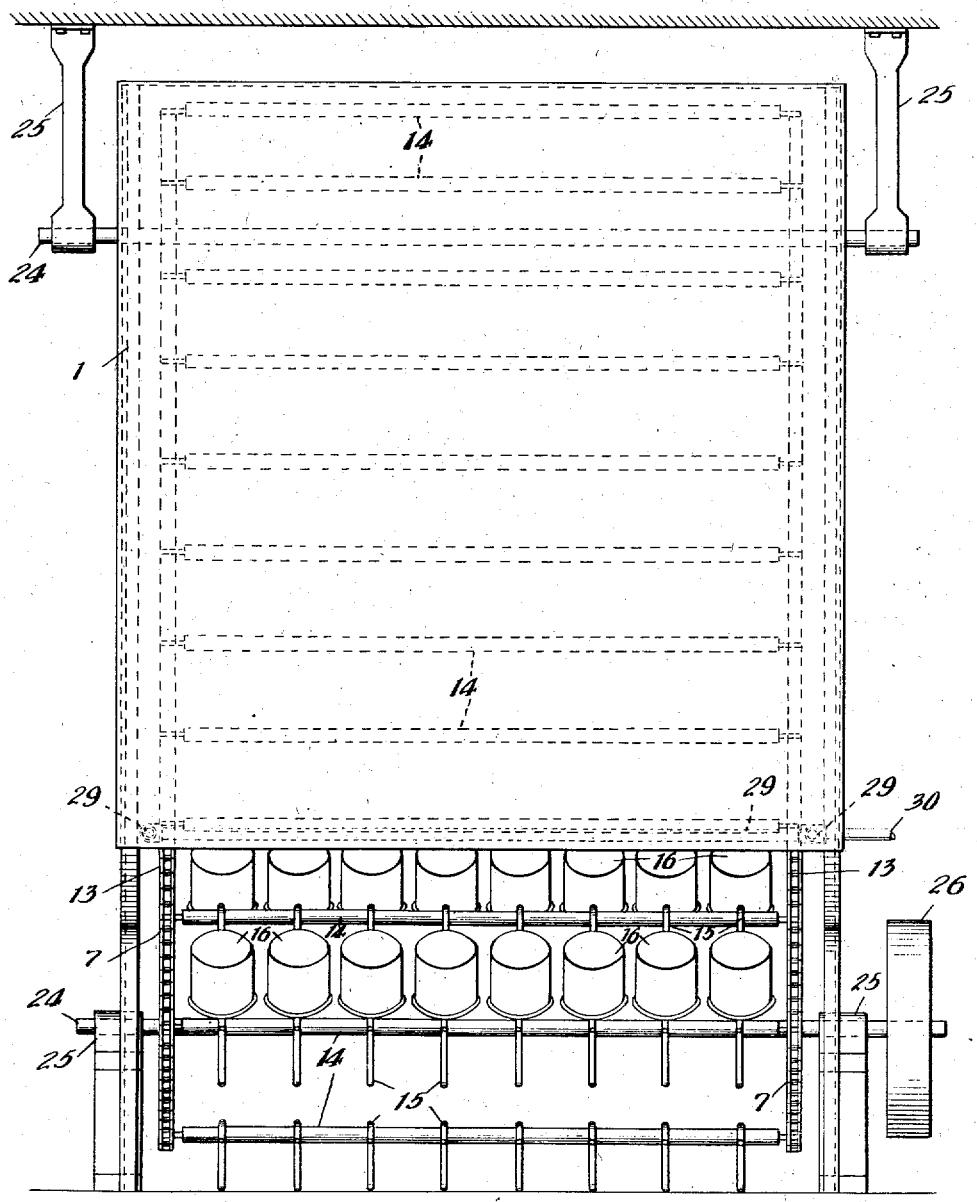

UNITED STATES PATENT OFFICE.

FRANKLIN RUDOLPH, OF CHICAGO, ILLINOIS, ASSIGNOR TO AMERICAN CAN COMPANY, OF NEW YORK, N. Y., A CORPORATION OF NEW JERSEY.

OVEN FOR DRYING OR BAKING COATED METAL VESSELS OR OTHER ARTICLES.

1,086,731.  Specification of Letters Patent.  Patented Feb. 10, 1914.

Application filed May 28, 1910. Serial No. 563,866.

*To all whom it may concern:*

Be it known that I, FRANKLIN RUDOLPH, a citizen of the United States, residing in Chicago, in the county of Cook and State of Illinois, have invented a new and useful Improvement in Ovens for Drying or Baking Coated Metal Vessels or other Articles, of which the following is a specification.

My invention relates to improvements in ovens for drying or baking painted, lacquered or coated sheet metal vessels or other articles.

The object of my invention is to provide an oven of a simple, efficient and economical construction, by means of which sheet metal vessels or other articles, after being lithographed or coated with paint, lacquer or other coating, may be rapidly and cheaply dried or baked and with a minimum expenditure of time and fuel.

My invention consists of an oven chamber having an entrance opening for the articles to be baked at its lower portion at one end and an opening for said articles at its lower portion at the other end, and an upwardly extended intermediate portion above the entrance and the exit openings, of an endless flexible conveyer extending into the oven chamber at the entrance end and traversing the same in a plurality of runs extending between the upper and lower portions of the oven chamber, and preferably consisting of a pair of endless flexible chains furnished with a series of article supporting rods extending between the chains and provided with a plurality of pivotal article supports, each preferably a wire hook adapted to receive a coated vessel in an inverted position and to convey it up and down in and through the oven chamber in such inverted position.

It further consists in combination with the above, of an inclined drip board at the entrance end of the oven chamber and underneath the article supports of the oven chamber to take the drip from the freshly coated vessels or other articles as they are carried into the oven chamber by the endless conveyer.

It further consists in the novel construction of parts and devices and in the novel combinations of parts and devices herein shown and described and more particularly specified in the claims.

In the accompanying drawing forming a part of this specification, Figure 1 is a central, vertical, longitudinal section of a baking or drying oven embodying my invention. Fig. 2 is a vertical cross section on line 2—2 of Fig. 1. Fig. 3 is a central, vertical, longitudinal section illustrating a modification, and Fig. 4 is a front elevation of the construction shown in Fig. 3, the ceiling of the room containing the oven being indicated in section.

In the drawing, 1 represents an upright oven, its walls being preferably of brick or masonry, and having an entrance opening 2 in its front end 3 at the lower portion, or bottom thereof and an opening 4 in its rear end wall 5, the intermediate elevated portion 6 of the oven chamber extending upwardly to a considerable height above the openings 2, and 4.

7 is an endless flexible conveyer extending into the oven chamber at the entrance opening 2 near its lower portion and upwardly and downwardly through the oven chamber to the opening 4 thereof in a plurality of upright runs 8, 9, 10, 11, and thence out through the entrance opening 2 in a horizontal run 12. The endless flexible conveyer 7 preferably comprises a pair of chains 13, 13, furnished with article supporting rods 14 extending between the chains at intervals, and furnished each with a plurality of swivel or pivotal article supports 15. The article supports 15 each preferably consists of a wire hook adapted to receive a coated sheet metal vessel 16 in an inverted position, and provided with an eye 17 to give it a pivotal or swivel connection with the supporting rod 14 of the conveyer.

The conveyer chains 13, 13 travel over or around pulleys or sprocket wheels 18, 19, 20, 21, 22, 23, the sprocket wheel 18 being outside the oven chamber near the entrance end thereof and the sprocket wheel 23 near the opening 4 of the oven chamber, and sprocket wheels 20, 22 being in the upper portion of the oven chamber and sprocket wheels 19, 21 at the lower portion thereof. Each pair of sprocket wheels is preferably secured to a common shaft 24, the same being journaled in suitable brackets or hangers 25.

26 is the driving pulley for operating the conveyer, the same being secured to the shaft of one pair of sprocket wheels.

An inclined drip board or trough 27 is arranged under the upper horizontal run 28 of the conveyer 7 at the entrance end of the oven chamber to collect the drip from the freshly coated vessels 16 as they are being carried into the oven chamber by the endless conveyer. As the coated sheet metal vessels or articles 16 to be baked or dried are suspended by pivotal supports from the conveyer, they will be carried up and down through the oven chamber and always in an inverted position whether moving horizontally, vertically, downwardly or in an inclined direction.

The coated vessels or articles 16 are placed on the pivotal supports or hooks 15 suspended from the supporting rods 14 of the endless flexible conveyer 7 as the conveyer chains pass around the sprocket wheels 18 at the entrance end of the oven and the baked or dried vessels or articles are removed from the supports or hooks 15 as the conveyer 7 moves past the exit opening 4 at the rear end of the oven chamber.

The oven chamber is preferably heated by means of a series of gas burners 29, the same preferably consisting of jet openings in gas supply pipes 30 extending through the oven chamber at the lower portion thereof, and preferably just above the openings 2 and 4.

In the modification shown in Figs. 3 and 4 of the drawing, the walls of the oven chamber are illustrated as being made of sheet steel or other metal and the conveyer has only two upright runs 8ª and 11ª, the intermediate runs 9, 10 being omitted, as well as the additional sprocket wheels. In the construction shown in this modification, the walls of the oven chamber are represented as extending down only a little below the burner pipes, thus leaving the oven chamber uninclosed at its bottom or lower portion at both sides and ends.

I claim:—

1. In an oven for drying or baking coated vessels or other articles, the combination with an oven chamber having an entrance opening at one end and an opening at the other end and an upwardly extending intermediate portion between said openings, of a conveyer having a substantially horizontal run and a plurality of upright runs for carrying the articles to be baked or dried into and up and down through said chamber, and a drip board under said horizontal run of the conveyer, substantially as specified.

2. In an oven for drying or baking coated vessels or other articles, the combination with an oven chamber having an entrance opening at one end and an opening at the other end and an upwardly extended intermediate portion between said openings, of a conveyer for carrying the articles to be baked or dried into and up and down through said chamber from the entrance opening to said other opening, said conveyer comprising a pair of conveyer chains and a plurality of article supporting rods extending between said chains, said supporting rods being furnished with a series of pivoted supporting hooks adapted to receive vessels in an inverted position and suspend the same in such position continuously as they are conveyed into and up and down through the oven, substantially as specified.

3. In an apparatus of the character described, an oven chamber and a conveyer for carrying articles to be baked through said chamber, said conveyer having a plurality of transversely extending rods, each rod having a plurality of independently pivoted supporting hooks mounted thereon, substantially as specified.

FRANKLIN RUDOLPH.

Witnesses:
EDMUND ADCOCK,
PEARL ABRAMS.

---

It is hereby certified that in Letters Patent No. 1,086,731, granted February 10, 1914, upon the application of Franklin Rudolph, of Chicago, Illinois, for an improvement in "Ovens for Drying or Baking Coated Metal Vessels or Other Articles," an error appears in the printed specification requiring correction as follows: Page 1, line 25, after the word "end" and line 70, after the reference numeral "5", and page 2, lines 48 and 61, after the word "end" insert the words *through which the articles may be removed;* and that the said Letters Patent should be read with this correction therein that the same may conform to the record of the case in the Patent Office.

Signed and sealed this 24th day of March, A. D., 1914.

[SEAL.]

J. T. NEWTON,
*Acting Commissioner of Patents.* of the conveyer 7 at the entrance end of the oven chamber to collect the drip from the freshly coated vessels 16 as they are being carried into the oven chamber by the endless conveyer. As the coated sheet metal vessels or articles 16 to be baked or dried are suspended by pivotal supports from the conveyer, they will be carried up and down through the oven chamber and always in an inverted position whether moving horizontally, vertically, downwardly or in an inclined direction.

The coated vessels or articles 16 are placed on the pivotal supports or hooks 15 suspended from the supporting rods 14 of the endless flexible conveyer 7 as the conveyer chains pass around the sprocket wheels 18 at the entrance end of the oven and the baked or dried vessels or articles are removed from the supports or hooks 15 as the conveyer 7 moves past the exit opening 4 at the rear end of the oven chamber.

The oven chamber is preferably heated by means of a series of gas burners 29, the same preferably consisting of jet openings in gas supply pipes 30 extending through the oven chamber at the lower portion thereof, and preferably just above the openings 2 and 4.

In the modification shown in Figs. 3 and 4 of the drawing, the walls of the oven chamber are illustrated as being made of sheet steel or other metal and the conveyer has only two upright runs 8ª and 11ª, the intermediate runs 9, 10 being omitted, as well as the additional sprocket wheels. In the construction shown in this modification, the walls of the oven chamber are represented as extending down only a little below the burner pipes, thus leaving the oven chamber uninclosed at its bottom or lower portion at both sides and ends.

I claim:—

1. In an oven for drying or baking coated vessels or other articles, the combination with an oven chamber having an entrance opening at one end and an opening at the other end and an upwardly extending intermediate portion between said openings, of a conveyer having a substantially horizontal run and a plurality of upright runs for carrying the articles to be baked or dried into and up and down through said chamber, and a drip board under said horizontal run of the conveyer, substantially as specified.

2. In an oven for drying or baking coated vessels or other articles, the combination with an oven chamber having an entrance opening at one end and an opening at the other end and an upwardly extended intermediate portion between said openings, of a conveyer for carrying the articles to be baked or dried into and up and down through said chamber from the entrance opening to said other opening, said conveyer comprising a pair of conveyer chains and a plurality of article supporting rods extending between said chains, said supporting rods being furnished with a series of pivoted supporting hooks adapted to receive vessels in an inverted position and suspend the same in such position continuously as they are conveyed into and up and down through the oven, substantially as specified.

3. In an apparatus of the character described, an oven chamber and a conveyer for carrying articles to be baked through said chamber, said conveyer having a plurality of transversely extending rods, each rod having a plurality of independently pivoted supporting hooks mounted thereon, substantially as specified.

FRANKLIN RUDOLPH.

Witnesses:
EDMUND ADCOCK,
PEARL ABRAMS.

---

It is hereby certified that in Letters Patent No. 1,086,731, granted February 10, 1914, upon the application of Franklin Rudolph, of Chicago, Illinois, for an improvement in "Ovens for Drying or Baking Coated Metal Vessels or Other Articles," an error appears in the printed specification requiring correction as follows: Page 1, line 25, after the word "end" and line 70, after the reference numeral "5", and page 2, lines 48 and 61, after the word "end" insert the words *through which the articles may be removed;* and that the said Letters Patent should be read with this correction therein that the same may conform to the record of the case in the Patent Office.

Signed and sealed this 24th day of March, A. D., 1914.

[SEAL.]

J. T. NEWTON,
*Acting Commissioner of Patents.*

It is hereby certified that in Letters Patent No. 1,086,731, granted February 10, 1914, upon the application of Franklin Rudolph, of Chicago, Illinois, for an improvement in "Ovens for Drying or Baking Coated Metal Vessels or Other Articles," an error appears in the printed specification requiring correction as follows: Page 1, line 25, after the word "end" and line 70, after the reference numeral "5", and page 2, lines 48 and 61, after the word "end" insert the words *through which the articles may be removed;* and that the said Letters Patent should be read with this correction therein that the same may conform to the record of the case in the Patent Office.

Signed and sealed this 24th day of March, A. D., 1914.

[SEAL.]

J. T. NEWTON,
*Acting Commissioner of Patents.*